United States Patent [19]

Backhaus

[11] Patent Number: 4,944,529
[45] Date of Patent: Jul. 31, 1990

[54] INFLATABLE PROTECTIVE CUSHION

[75] Inventor: Hans-Gerd Backhaus, Wettstetten, Fed. Rep. of Germany

[73] Assignee: Audi AG., Ingolstadt, Fed. Rep. of Germany

[21] Appl. No.: 243,438

[22] Filed: Sep. 13, 1988

Related U.S. Application Data

[63] Continuation of Ser. No. 941,758, Dec. 15, 1986, abandoned.

[30] Foreign Application Priority Data

Dec. 14, 1985 [DE] Fed. Rep. of Germany ....... 3544248

[51] Int. Cl.$^5$ .............................................. B60R 21/22
[52] U.S. Cl. .................................... 280/743; 383/120; 206/522
[58] Field of Search ................... 280/730, 743, 742; 383/120, 79, 37, 107, 902, 907; 206/522

[56] References Cited

U.S. PATENT DOCUMENTS

| | | | |
|---|---|---|---|
| 528,421 | 10/1894 | Estlow | 383/120 |
| 2,234,065 | 3/1941 | Vogt | 383/120 |
| 2,701,878 | 2/1955 | Davis | 383/120 |
| 3,072,270 | 1/1963 | Tolby et al. | 206/522 |
| 3,276,670 | 10/1966 | Harvey | 383/120 |
| 3,358,903 | 12/1967 | De Stefano et al. | 383/120 |
| 3,618,978 | 11/1971 | Klove | 280/730 |
| 3,810,654 | 5/1974 | DeBano, Jr. et al. | 280/743 |
| 4,491,217 | 1/1985 | Weder et al. | 383/120 |

FOREIGN PATENT DOCUMENTS

| | | | |
|---|---|---|---|
| 859428 | 12/1952 | Fed. Rep. of Germany | 383/120 |
| 2224827 | 5/1972 | Fed. Rep. of Germany | 280/743 |
| 77338 | 6/1977 | Japan | 280/728 |

Primary Examiner—Charles A. Marmor
Assistant Examiner—Karin Tyson
Attorney, Agent, or Firm—Karl Hormann

[57] ABSTRACT

An inflatable protective cushion (air bag) for use in an automotive vehicle. The cushion in its folded condition is of substantially quadrilateral configuration and includes superposed congruent impact surfaces joined to each other along their longitudinal margins and, along their lateral margins, by side surfaces folded inwardly. The cushion is made from no more than two flat blanks cut from web material with little or no waste.

16 Claims, 5 Drawing Sheets

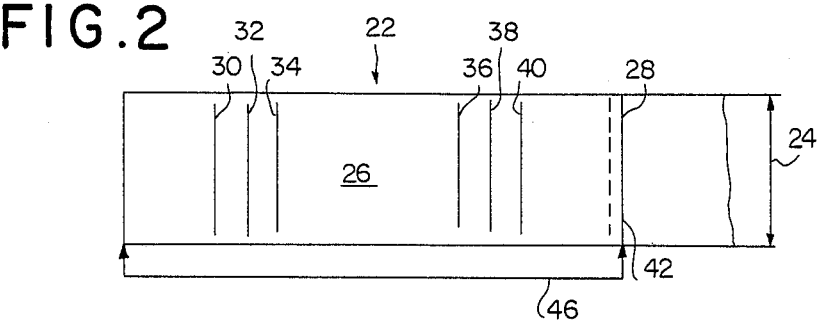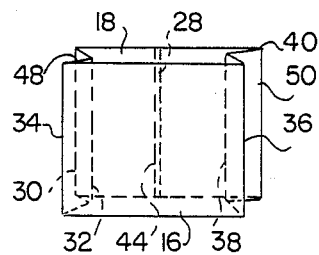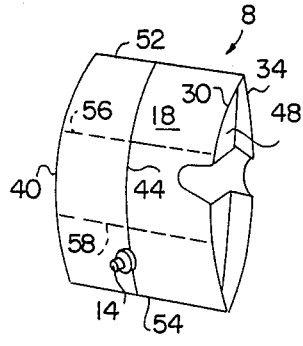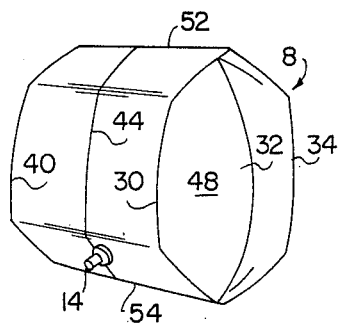

INFLATABLE PROTECTIVE CUSHION

This is a continuation of application Ser. No. 941,758, filed Dec. 15, 1986 now abandoned.

BACKGROUND OF THE INVENTION

1. Field of the Invention

The present invention relates to inflatable protective cushions of the kind useful in automotive vehicles, and more particularly to protective cushions of the kind which are substantially instantaneously inflatable and positonable to protect passengers from injuries in case the vehicles are involved in a front-end collision.

Inflatable protective cushions, conventionally known as air bags, have been proposed for installation in passenger vehicles as devices to protect passengers from injuries which may result from a collision with an impediment or an approaching vehicle.

In their folded-down inoperative position the cushions are typically compactly folded and stored in containers in or near the dashboard or in the back rest of a front seat if the cushions are to protect passengers occupying rear seats. If the vehicle is involved in a front-end collision a source of pressurized gas is activated abruptly or at least substantially instantly to inflate the cushion and to move it into a protective position between the passenger and structure of the vehicle likely to cause injury to the passenger.

To be effective an air bag must not only be convertible from its compact folded condition to its inflated large volume condition in an instant, but it should also, to be an attractive feature of an automobile, be of as small a volume as possible when in its folded-down condition so that its storage container may be dimensioned correspondingly small to be inconspicuous.

2. Description of the Prior Art.

West German Patent Specification DE-OS 27 22 551 discloses an inflatable protective cushion of substantially drum-like configuration. However, because of its necessarily circular end surfaces it is very difficult to fold such a cushion into a regular and uniform shape. Moreover, the circular end surfaces of such a cushion result in excessive waste of material during its manufacture.

West German Patent Specification DE-OS 25 36 933 discloses substantially circular cushions which when inflated are of relatively small volume and which may be foldable with relative ease; but again, the cutting of their blanks results in much wasted material.

West German Patent Specifications DE-OSn 25 28 636 and 25 29 602, for instance, disclose air bags the shapes of which, when inflated, conform more or less to the body of a passenger. These air bags are made from substantially rectangular blanks. Unfortunately, they require too many seams which makes their manufacture unduly complicated and correspondingly dear. Also, in their folded-down condition these air bags occupy unduly large spaces.

Somewhat similar air bags are taught by west German Patent Specifications DE-OSn 23 22 629 (U.S. Pat. No. 3,810,654) and 22 24 827. When folded-down, these are of substantially rectangular configuration with substantially congruent impact surfaces; but because of seams which determine their configuration in the inflated condition they cannot be folded down into a truly compact shape.

3. Summary of the Invention and Objects

It is an object of the invention to provide an inflatable protective cushion which may be made with no or substantially no waste.

It is a further object of the invention to provide a protective cushion which requires few seams only so that it may be manufactured in a cost-effective manner.

It is also object of the invention to provide a protective cushion which may be folded down easily and uniformly into a very small volume.

It is also an object of the invention to provide a protective inflatable cushion the seams of which do not adversely influence the shape of the cushion in its inflated condition.

Moreover, an object of the invention resides in the provision of an airbag which when inflated provides for a large volume in its effective or active direction, i.e. in the direction in which impact forces act.

Other objects will in part be obvious and will in part appear hereinafter.

SUMMARY OF THE INVENTION

In the accomplishment of these and other objects the invention, in a preferred embodiment thereof, provides for an inflatable protective cushion comprising a pair of superposed quadrilateral and substantially congruent impact absorbing web members joined to each other along a first pair of opposite margins and extending at a second pair of opposite margins positioned angularly relative to said first pair into side web means folded substantially symmetrically along a fold line positioned between said web members. The quadrilateral web members may be of generally rectangular or trapezoidal configuration. The configuration of the side web means in their flat, spread-out state may be a rectangle, a trapezoid, a triangle, or a trapezium. Advantageously, upper and lower marginal portions of the side web means are joined to the first pair of opposite margins of the web members. The web members and the side web means may be integral with each other and may be formed into a cushion by no more than two horizontal seams joining said impact absorbing web members along said first pair of opposite margins and two seams extending at predetermined angles relative to said horizontal seams and joining said side web means. In a preferred embodiment, only one vertical seam is required which is advantageously positioned centrally of one of the quadrilateral web members. In a preferred embodiment the vertical seam is positioned centrally of the web member facing in the direction of potential impact.

DESCRIPTION OF THE DRAWINGS

The novel features considered characteristic of the invention are set forth with particularly in the appended claims. The invention itself, however, in respect of its organization as well as its method of operation, together with other objects and advantages thereof, will be best understood from the following description of the preferred illustrative embodiments when read in conjunction with the accompanying drawings in which like reference numerals, with suffixes as required to distinguish between the various embodiments, designate like elements, and in which:

FIG. 2 is a blank of material for making a protective cushion having substantially rectangular impact surfaces and side surfaces;

FIG. 3 is a diagram showing the sequence of folding the blank of FIG. 2 during manufacture of a cushion;

FIG. 4 is a perspective view of a protective cushion made from the blank of FIG. 2;

FIG. 5 is a perspective view of the cushion of FIG. 4 in its inflated condition;

DESCRIPTION OF THE PREFERRED EMBODIMENTS

Figure 1:
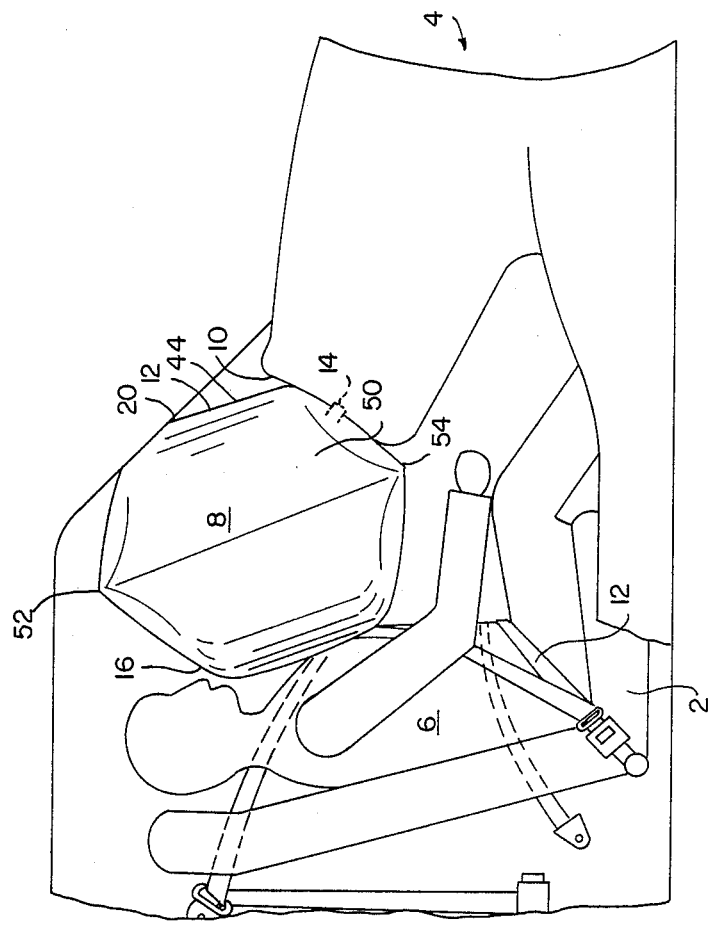
FIG. 1 is a side view, partially in section, of the forward passenger compartment of an automobile showing a passenger occupying in a front seat and an inflated protective cushion in accordance with the invention.

FIG. 1 is a schematic view, partly in section, of an automobile 4 including the front seat 2 thereof depicting the approximate cooperative position between a passenger 6 seated in the front seat 2 and an inflated protective cushion 8 in accordance with the invention. The protective cushion 8, hereafter referred to as an air bag, may be arranged between the passenger 6 and a dashboard 10 in a manner aiming at substantially reducing the potential of injury to the passenger 6 if hurled or thrown forward in a front-end collision, it being assumed that the passenger 6 would be hurled forward in such a collision even though he may be wearing a seat belt 12. An aperture or blow hole 14 through which gas may be blown into the air bag 8 to fill it substantially instantly and a container (not shown) for storing the air bag 8 in its inoperative collapsed or folded-down condition may be arranged in or near the dashboard 10 or, in an arrangement not illustrated but appreciated by those skilled in the art, in the backrest of a front seat 2. The airbag 8 has a rearwardly directed impact surface 16 generally facing the upper torso of the passenger 6, and a forward impact surface 18 which is partly supported by the dashboard 10 and partly by a windshield 20. The volume of the inflated air bag 8 is preferably such that it provides for a significant distance between its forward and rearward impact surfaces 16 and 18. This would allow the gas pressure within the air bag 8 to be somewhat lower than is conventional, to reduce the adverse effects or consequences of an impact (bruises and the like) on the passenger 6.

The air bag 8 may be made from a blank 26 cut along a line 28 from a substantially endless web 22 of material as shown in FIG. 2. In its inoperative folded-down condition, the air bag 8 of this embodiment is of substantially rectangular configuration. The width 24 of the web 22 may be substantially equal to the height of the airbag 8. As the cutting line 28 extends substantially normal of the longitudinal axis of the web 22, no waste material is generated in the manufacture of the air bag 8. All of its fold lines 30, 32, 34, 36, 38, and 40, as well as a narrow longitudinal portion 42 of web material required for forming a vertical or transverse lap seam 44 extend in parallel to the cutting line 28. As will be apparent, folds along lines 32 and 38 are directed oppostie those along lines 30, 34, 36, and 40. In a completely assembled air bag 8, the web portions including the fold lines 32 and 38 positioned between the fold lines 30, 34, and 36, 40, respectively, form side surfaces 48 and 50 connecting the impact surface 16 and 18. The side surfaces are divided into symmetrical sections by their respective fold lines 32 and 38.

FIG. 3 is a diagram showing the sequence of folding the blank 26 for assembly into the air bag 8. The length 46 of the blank 26, excluding the lap seam portion 42, is equal to the sum of the widths of the two impact surfaces 16, 18, and of the two side surfaces 48 and 50. The side surfaces 48 and 50 are preferably integral with the impact surfaces 16 and 18 and, as shown, constitute those portions of the blank 26 positioned between the fold line 30 and 34, and 36 and 40, respectively.

Only three seams, i.e. an upper and a lower seam 52 and 54 (FIG. 1) and the lap seam 44, are needed to assemble the air bag 8. In the assembled air bag 8, the lap seam 44 may preferably be placed to extend vertically through the center of the forward impact surface 18. In a preferred mode the seams are made with an adhesive compatible with the material of the web 26; but they may also be made by any other method known in the art, including, for instance, heat sealing.

The air bag 8 comprises two congruent impact surfaces 16 and 18 and two inwardly folded side surfaces 48 and 50 which, as described, are preferably integral with the impact surfaces 16 and 18. The side surfaces 48 and 50 are also joined to the impact surfaces 16 and 18 along the upper and lower transverse seams 52 and 54 to form a substantially air-tight chamber. The central fold lines 32 and 38 of the side surfaces 48 and 50, in the collapsed condition of the air bag 8, are positioned between the impact surfaces 16 and 18, and in the inflated condition, the side surfaces 48 and 50 contribute significantly to enlarging the volume of the air bag 8 in the direction of any impact in collision.

Figure 15:
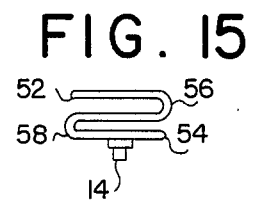
FIG. 15 is a side view of a cushion in accordance with the present invention in its inoperative folded condition.

FIG. 4 is a perspective view of the air bag 8 made from the blank of FIG. 2. The air bag 8, after the folding along lines 56 and 58, needs little space for its storage because of its extremely compacted flat configuration. The folding along lines 56 and 58 may be in the same direction or as illustrated in FIG. 15 in opposite directions.

Figure 6:
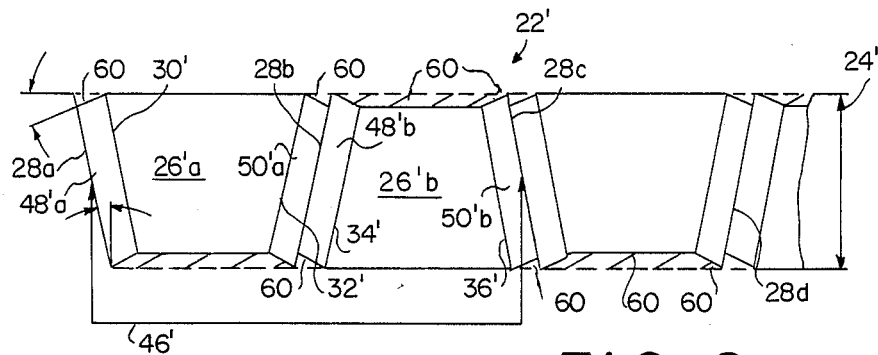
FIG. 6 is diagram illustrating the cutting of blanks for making an alternative embodiment of a protective cushion with trapezoidal impact surfaces and rectangular side surfaces in accordance with the invention.
Figure 8:
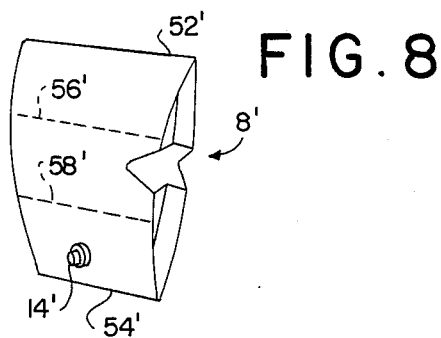
FIG. 8 is a perspective view of a cushion made from the blanks of FIG. 7.

FIG. 6 depicts the position of fold lines 30, 32, 34, 36, and cut lines 28'a, 28'b, and 28'c of a pair of blanks 26'a and 26'b in a web 22' of material for making an alternative embodiment of an air bag 8' (FIG. 8). Lines 28'a, 30', 36' and 28'c, and 32', 28'b and 34', respectively, extend in parallel to each other and extend obliquely relative to the longitudinal axis of the web 22' so that the blanks 26'a and 26'b are alternately positioned but otherwise identically configured congruent trapezoids. Accordingly, air bags 8' made from these blanks are also of trapezoidal configuration, at least in their folded-down state. The shape of the air bag 8' is intended to provide increased protection for the head of a passenger without requiring an undue increase in the volume of the air bag 8'.

Figure 7:
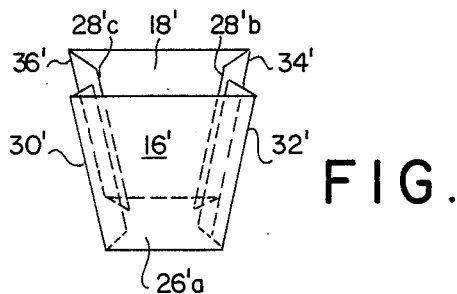
FIG. 7 is a diagram illustrating the folding and relative position of the blanks of FIG. 6 in an intermediate manufacturing stage.

The manufacture of the air bag 8' results in very little waste of web material as indicated by shade-lined sections 60. The two blanks 26'a and 26'b are used to form forward and rearward impact surfaces 16' and 18'. Joined to their fold lines 30', 32' and 34', 36' the blanks 26'a 26'b are respectively provided wih substantially rectangular extensions 48'a, 50'a and 48'b, 50'b. The outer edges of these extensions are identical with the cut lines 28'a, 28'b, and 28'c. After rotating one of the blanks 26'a or 26'b into the same orientation as the other blank and folding the extensions along lines 30', 32' and 34', 36' as shown in FIG. 7 the blanks may be brought into superposition and transversal seams may be formed by joining the outward margins 28'a, 28'b, and 28'c. Also, longitudinal seams 52' and 54' may be formed along the upper and lower margins of the blanks.

The resultant air bag 8' is depicted in FIG. 8 and consists of two superposed trapezoid impact surfaces 16' and 18' as well as side surfaces 48' and 50'. Its complete assembly requires a total of only four seams. It may be folded down into a neat compact package similar to that discussed in connection with the embodiment of FIG. 4 or that shown in FIG. 15 along lines 56' and 58'.

Figure 9:
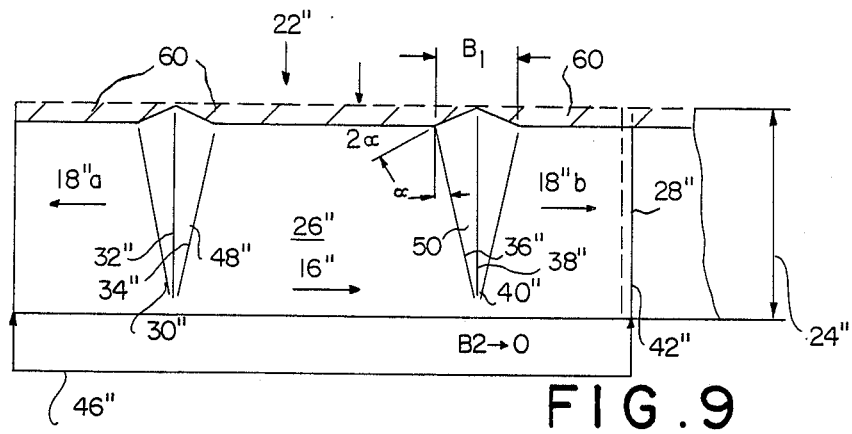
FIG. 9. depicts the cutting of a blank from a web for making a cushion of another configuration in accordance with the invention.

FIG. 9 is another planar view illustrating the cutting of a blank 26" from an endlesss web 22" for manufacturing a further embodiment of an air bag 8" of trapezoidal configuration. This embodiment permits manufacture from an integral blank 26" cut from the web 22". The blank 26" having a length 46" is severed from the web 22" along a line 28" extending normal to the longitudinal axis of the web 22". A narrow strip of waste portions 60 the width of which is a function of the angle $\alpha$ (see FIG. 9), is also removed along the upper margin of the web 22". The amount of waste is, however, insignificant. The blank 26" comprises trapezoidal impact surface areas 18"a, 18"b and 16", two tapered side surfaces 48" and 50" having the general shape of a trapezium, as well as an overlap seam portion 42". The length of the blank 26" is about equal to the sum of the median widths of the impact surfaces 16", 18", of the side surfaces 48" and 50" and of the seam section 42". The upper and lower margins of the side surfaces 48" and 50" have different width $B_1$ and $B_2$, respectively, and while preferrably integal with the impact surface areas 16" and 18" , the side surfaces 48" and 50" are offset from them along converging fold lines 30", 34" and 36", 40", respectively. Each side surface area 48" and 50" includes a central fold line 32" and 38", respectively. As shown in FIG. 9 the width of the lower margin $B_2$ of the side surfaces 48" and 50" approaches 0. The width $B_1$ of the upper margin determines the angle $\alpha$ and, hence, the width of the strip waste material 60 to be removed from the blank 26".

Figure 11:
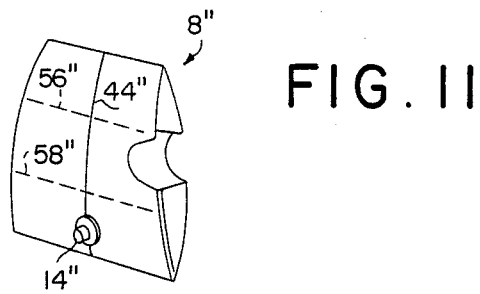
FIG. 11 is a perspective view of a cushion made from the blank of FIG. 10.

As in the embodiment of FIG. 2 the folds along lines 32" and 38" are opposite those along lines 30", 34", 36" and 40". The folding and seaming operation in the embodiment of FIG. 11 is essentially identical to that of the embodiment of FIG. 2 and results in a transverse seam 44" extending preferably centrally of the forward impact surface 18" as well as upper and lower longitudinal seams 52" and 54". When fully assembled, the air bag 8" may be folded neatly into a compact package along lines 56" and 58".

Figure 10:
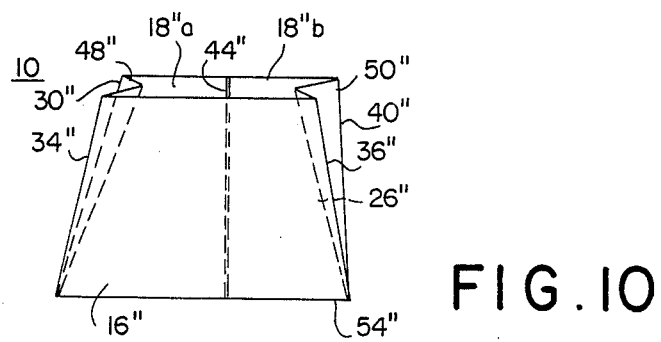
FIG. 10 illustrates the folding of the blank of FIG. 9.
Figure 12:
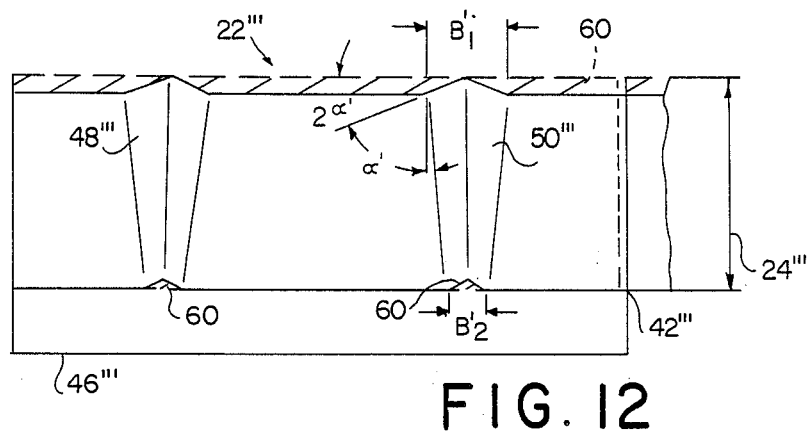
FIG. 12 depicts still another blank for making a cushion in accordance with the present invention.
Figure 13:
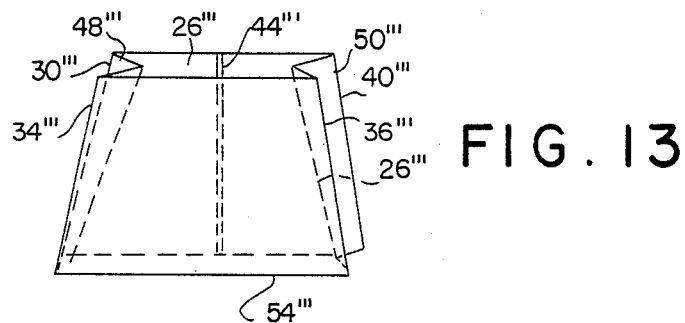
FIG. 13 shows the folding of the blank of FIG. 12.
Figure 14:
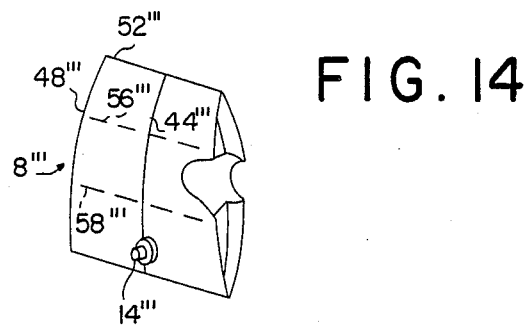
FIG. 14 is a perspective of a cushion made from the blank of FIG. 12.

The embodiment of FIGS. 12, 13, 14 is similar in structure and assembly operation to that of FIGS. 9, 10, and 11, except that the lower margin $B'_2$ of its tapered side surfaces 48"" and 50"' is wider than that of the previously described embodiment. It is, therefore, not taught necessary to render a detailed description of this embodiment as the previously described one sets forth the necessary details.

It will be appreciated that the configurations of the various embodiments of air bags described above may be adjusted to suit particular circumstances, needs, or structures. "Upper" and "lower" as used in connection with any of the side surfaces or seams disclosed are terms arbitrarily applied, it being understood that they may be reversed where circumstances require it. The mounting of the blow hole into air bags in accordance with this invention has not been described as it is entirely conventional. As stated hereinabove, and as shown in FIG. 1 however, the blow hole is preferably provided in the impact surface facing away from a passenger. As will be appreciated by those skilled in the art, all web section referred to above in connection with the differently configured airbags may for convenience and ease of definition be said to be surrounded by, or along fold lines to be provided with, margins.

In order to provide sufficient stability, i.e. longevity, to longitudinal as well as transverse seams, the web sections or blanks should preferably be provided with overlap sections (not shown in connection with the longitudinal seams) and/or, additional folds (also shown). It would also be within the scope of this invention to provide side surfaces of different widths or configurations. The embodiments of FIGS. 4 and 8, for instance, could easily be adapted to such arrangements. This would allow to compensate for asymmetrically configured dashboards and to shape the impact surface facing a passenger as a substantially planar surface positioned normal to the direction of an impact. In this manner lateral sliding or slipping of the passenger along the impact surface could effectively be prevented.

Materials suited for manufacturing air bags 8 in accordance with the invention are well known in the art. They should be pliable and impervious to gas. Air-impervious foils of resinous materials, such as, for instance, polyvinylchloride, polyethylene, and polyurethane, with or without a fabric backing, have been found to be particularly useful. The material should retain its imperviousness and pliability for a period not less than the expected life of the vehicle in which the air bags may be mounted.

When assembling the air bags their transverse seam or seams should preferably be made before their longitudinal seams. The blanks for making the air bags may be hand-cut from the web material; but they may be cut more economically and with greater uniformity by clicking machines.

In order to fit an air bag of the kind described supra into a container near or in a dashboard or in the back rest of a front seat 2, it should preferably be folded at a right angle relative to its longitudinal and/or transverse margins so that in the folded condition the blow hole of the air bag may be positioned as indicated in FIG. 1 to assure rapid and uniform inflatibility.

As variations in manufacturing steps, configurations or materials of air bags or protective cushions in accordance with the invention may be apparent to those skilled in the art, the disclosure of the present specification is intended solely for illustration and not for limiting the scope of the invention.

What is claimed is:

1. An inflatable cushion for the protection of passengers in an automotive vehicle, comprising:

first and second quadrilateral and substantially congruent web means in superposed relation, each web means comprising first and second margins positioned opposited each other and third and fourth margins positioned opposite each other and extending along lines intersecting said first and second margins;

third web means comprising fifth and sixth margins positioned opposite each other and at least a seventh margin extending along a line intersecting said fifth and sixth margins, said fifth and sixth margins being connected to one of said third and fourth margins of said first and second quadrilateral web means and said seventh margin being substantially coextensive with one of said first and second margins of said first and second quadrilateral web means;

fourth web means comprising eighth and ninth margins positioned opposite each other and at least a tenth margin extending along a line intersecting said eighth and ninth margins, said eighth and ninth margins being connected to the other of said third and fourth margins of said first and second quadrilateral web means and said tenth margin being substantially coextensive with said one of said first and second margins of said first and second quadrilateral web means;

said third and fourth web means being positioned between said first and second quadrilateral web means and being folded along fold lines positioned between said fifth and sixth and said eighth and ninth margins, respectively, said seventh and tenths margins each forming first and second sections folded over and extending along each other and along said one of said first and second margins of said first and second quadrilateral web means;

first seam means for connecting one of said first and second margins of said first and second quadrilateral web means to each other and to said first and second sections of said seventh and tenth margins of said third and fourth web means;

second seam means for connecting the other of said first and second margins of said first and second quadrilateral web means to each other;

at least third seam means extending along a line intersecting said first and second margins of one of said first and second quadrilateral web means for forming a substantially enclosed chamber;

and means for inflating said chamber and located in one of said first and second seam means.

2. The cushion of claim 1, wherein said first and second quadrilateral web means are shaped rectangularly.

3. The cushion of claim 2, wherein one of said first and second quadrilateral web means comprises two sections connected to each other by said third seam means.

4. The cushion of claim 3, wherein, when said cushion is inflated, one of said first and second quadrilateral web means faces away from the passenger and wherein said third seam means is provided in the quadrilateral web means facing away from the passenger.

5. The cushion of claim 4, wherein said means for inflating said chamber is provided in the quadrilateral web means provided with said third seam.

6. The cushion of claim 2, wherein said third and fourth web means are respectively provided with eleventh and twelfth margins extending in parallel with said seventh and tenth margins, respectively, and each forming third and fourth sections coextensive with the other of said first and second margins of said first and second quadrilateral web means, each of said third and fourth sections being folded over and connected to the other of said first and second margins of said first and second quadrilateral web means by said second seam means.

7. The cushion of claim 2, wherein said cushion is foldable along lines parallel to said first and second margins.

8. The cushion of claim 2, wherein said cushion is foldable along lines parallel to said third and fourth margins.

9. The cushion of claim 1, wherein said first and second quadrilateral web means are shaped trapezoidally.

10. The cushion of claim 9, wherein said first and second margins extend parallel to each other.

11. The cushion of claim 9, wherein one of said first and second quadrilateral web means comprises two sections connected to each other by said third seam means.

12. The cushion of claim 11, wherein, when said cushion is inflated, one of said first and second quadrilateral web means faces away from the passenger, and wherein said third seam means is provided in the quadrilateral web means facing away from the passenger.

13. The cushion of claim 3, wherein said means for inflating said chamber is provided in the quadrilateral web means provided with said third seam.

14. The cushion of claim 9, wherein said third and fourth web means are of trapezoidal configuration with the fold lines being positioned substantially intermediate said fifth and sixth and said eighth and ninth margins.

15. The cushion of claim 9, wherein said fifth and sixth and said eighth and ninth margins converge with each other and one of said first and second margins of said first and second quadrilateral web means.

16. The cushion of claim 10, wherein said cushion is foldable along lines parallel to said first and second margins.

* * * * *